United States Patent [19]

Stilley

[11] 4,159,657

[45] Jul. 3, 1979

[54] PLANETARY OUTER END

[75] Inventor: Herschel H. Stilley, Edwardsburg, Mich.

[73] Assignee: Clark Equipment Company, Buchanan, Mich.

[21] Appl. No.: 883,550

[22] Filed: Mar. 6, 1978

[51] Int. Cl.² .................. F16H 1/28; F16H 57/00; F16H 35/00; B60K 17/34

[52] U.S. Cl. .................................. 74/801; 74/391; 74/410; 180/75

[58] Field of Search .................. 74/801, 410, 391; 180/43 B, 70 R

[56] References Cited

U.S. PATENT DOCUMENTS

| | | | |
|---|---|---|---|
| 2,763,160 | 9/1956 | Buckendale | 74/391 |
| 2,922,321 | 1/1960 | Hiersig et al. | 74/801 |
| 2,941,423 | 6/1960 | Armington et al. | 74/801 |
| 3,150,532 | 9/1964 | Bixby | 74/801 X |
| 4,091,688 | 5/1978 | Huffman | 74/801 X |

Primary Examiner—Lance W. Chandler
Attorney, Agent, or Firm—Ernst H. Ruf

[57] ABSTRACT

A planetary outer end of the type commonly utilized on heavy duty drive axles has a plurality of members that include a planet carrier assembly having a planet carrier housing and an abutting carrier plate rigidly attached thereto wherein the improvement takes the form of hardened high strength hollow dowel pins that are press-fitted relative to both the carrier housing and the carrier plate for locating and securing the carrier housing and carrier plate against angular movement relative to one another with a plurality of cap screws extending axially freely through the hollow dowel pins for axially fastening together the carrier housing and carrier plate, whereby the dowel pins are subject only to torsional shear loading while the cap screws are subject only to axial tensile loading thereby producing a structure that approximates the strength of a unitary planet carrier.

17 Claims, 2 Drawing Figures

PLANETARY OUTER END

BACKGROUND OF THE INVENTION

1. Field of the Invention

The field of art to which this invention pertains includes multiple element planetary gear mechanisms and more specifically planetary wheel ends.

2. Description of the Prior Art

The use of drive axles with planetary outer ends is well known in such heavy duty applications as construction machinery and mining equipment. Planetary wheel ends have a multiplicity of members including a plurality of generally equiangularly disposed planetary pinions journalled in an appropriate carrier or carrier assembly. One known design utilizes an axle drive shaft to rotate a sun gear that meshes with this plurality of planet pinions which in turn react against a stationary internal ring gear, thereby causing the carrier assembly to rotate and thus become the planetary output member.

Generally, the planet carrier takes the form of a planet carrier assembly made up of several parts in order to permit the ready assembly and journalling of the planet pinions relative to the carrier assembly. One known design of this type utilizes a planet carrier housing having a plurality of boss portions that serve as mounting and locating areas for a planet carrier plate that is generally rigidly bolted to the former. The planet carrier housing and the planet carrier plate include concentric bores for retaining bearing assemblies that are used for journalling the planet pinions.

In heavy duty applications of this type, very high torque loads are transferred through the planetary assemblies, with this torque transfer tending to introduce a circumferential bending moment via the attempted rotation of the planet carrier plate relative to the planet carrier. However, even a small amount of circumferential twist between the carrier housing and the carrier plate will tend to effect the necessary bearing clearances, thereby drastically reducing the bearing service life. The use of cap screws for bolting together the carrier plate and carrier housing will reduce this undesired bending moment, but can, however, subject the cap screws to undesirable shear loads that will adversely affect their service life.

SUMMARY OF THE INVENTION

In order to eliminate the shear loading relative to the cap screws and in order to eliminate the undesirable bending moments, the improved planetary outer end of this invention utilizes high strength hardened steel hollow dowels that are press-fitted relative to both the carrier housing and the carrier plate. These hollow dowels serve to both locate and secure the carrier housing and carrier plate against angular movement relative to one another, with these dowel pins being subject only to torsional shear loading.

The carrier housing and carrier plate are securely fastened together by means of cap screws that are concentric with and extend axially freely through the hollow dowels. These cap screws, acting via washers on the carrier plate, introduce a clamping force between the carrier plate and the carrier housing to thereby eliminate the undesirable bending moment and insure that the hollow dowels are only subjected to a torsional shear load. Simultaneously, since only the dowels are subject to the shear loads, there are not shear loads on the cap screws themselves which are therefore subject only to tensile clamping loads. This produces an assembly that approximates the strength of a unitary planet carrier while yet permitting economical machining as well as rapid assembly of the planetary structure.

It should, of course, be understood that the features and advantages of this invention are not confined to wheel ends, but can be utilized in planetary assemblies of all types. Further features and advantages of this invention will be more readily understood by persons skilled in the art when following the detailed description in conjunction with the several drawings.

DESCRIPTION OF THE PREFERRED EMBODIMENT

Figure 1:
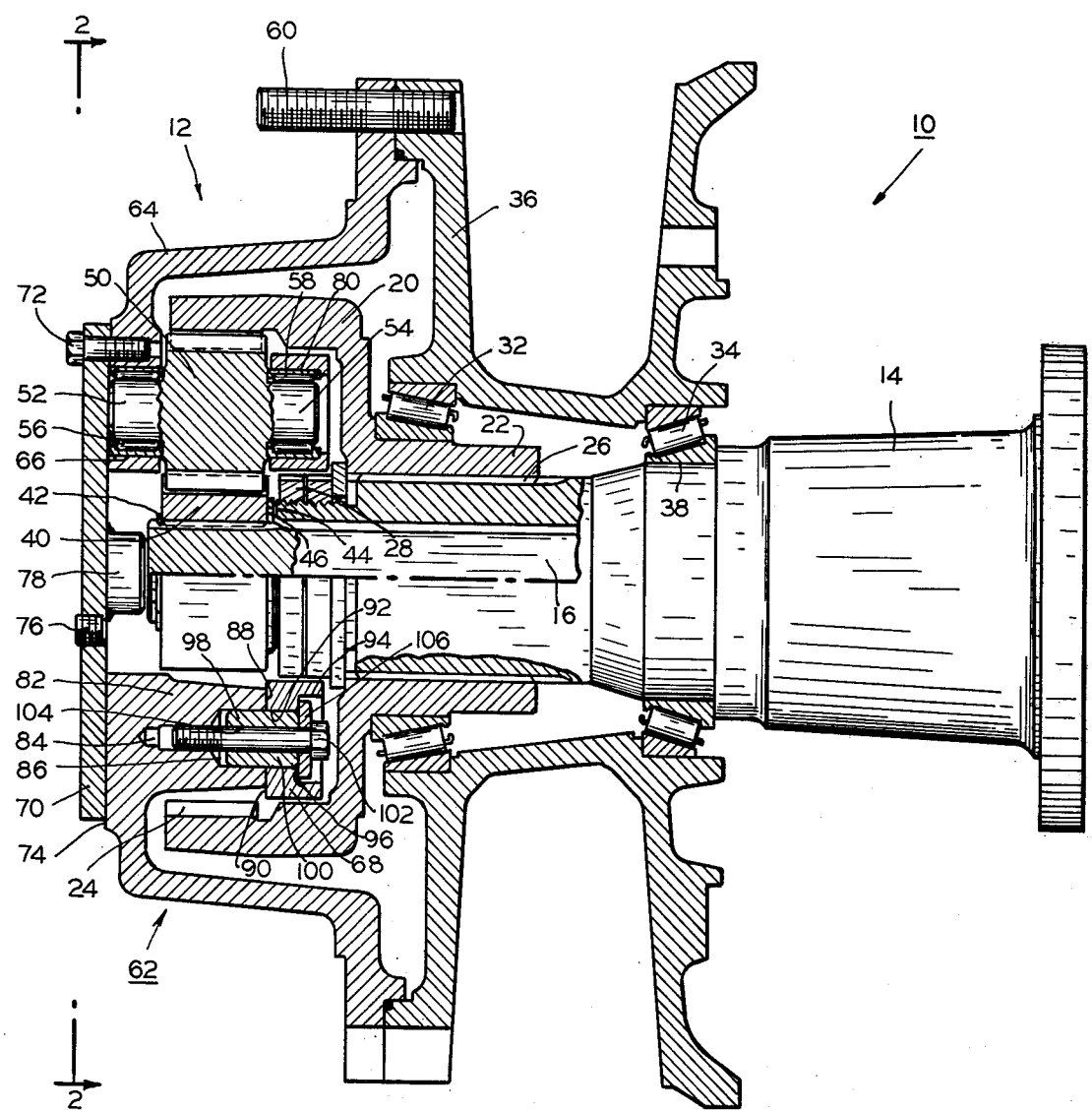
FIG. 1 is a fragmentary, partially sectioned view of a drive axle embodying the improved planetary outer end of the present invention.
Figure 2:
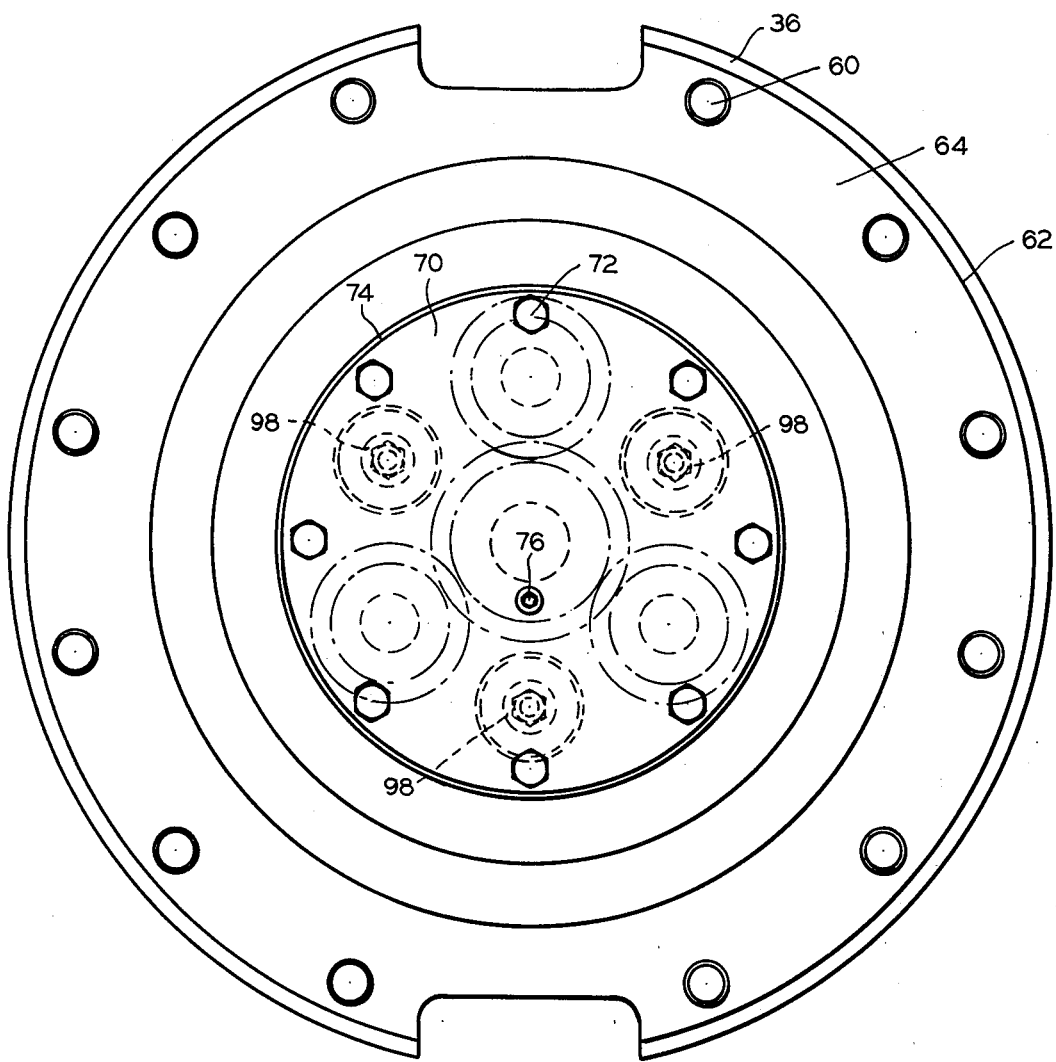
FIG. 2 is an end view looking in the direction of arrows 2—2 of FIG. 1.

Referring now to the drawings in detail, specifically to FIG. 1, the reference numeral 10 generally denotes a drive axle equipped at each end (only one end of which is shown) with a planetary outer or wheel end assembly 12 and an axle housing 14 that contains a differential (not shown) drivingly connected to planetary outer end 12 via an axle drive shaft 16.

Planetary outer end 12 includes hub 22 of a mounting member 20 which supports planetary internal ring gear 24, with hub 22 being internally splined to axle housing 14 at 26. Mounting member 20 is confined against axial movement by a lock nut 28. A pair of opposed tapered roller type anti-friction bearings 32 and 34 combine to rotatably journal a wheel hub 36, with outboard wheel hub bearing 32 having its inner race supported on hub 22 of mounting member 20, while the inner race of inboard bearing 34 is supported on shoulder 38 of axle housing 14. Mounting member 20 can be axially adjusted in order to properly preload bearings 32 and 34, with this adjustment also being accomplished via lock nut 28.

A sun gear 40 is splined to the outer end of axle drive shaft 16 and is axially restrained against outward movement by a retaining ring 42 but is kept from axial abutment with the annular outer end surface 44 of axle housing 14 via an annular washer 46 interposed therebetween. Sun gear 40 meshes with a plurality of equiangularly disposed planetary pinions 50 having integral opposed stub axles 52, 54 that are provided with caged roller bearings 56, 58, respectively, for journal support. The outer races of roller bearings 56 are fixedly retained in apertures 66 in planet carrier housing 64 of planet carrier assembly 62. Also forming part of planet carrier assembly 62 are planet carrier plate 68 and planet carrier cap 70, the latter being secured, via a plurality of bolts 72, to annular outer end face 74 of planet carrier housing 64. Cap 70 is provided with a plug 76 whose removal permits the checking of the lubricant level and the addition of further lubricant, if so required, into outer end 12. The interior surface of cap 70 is provided with a central abutment plug 78 which serves to limit the outward axial movement of axle drive shaft 16. Planet carrier housing 64 is fixedly secured to wheel hub 36 via a plurality of angularly spaced wheel mounting studs 60 that also serve for the mounting of a wheel structure (not shown).

Caged roller bearings 58 are fixedly retained in stepped bores or apertures 80 in planet carrier plate 68. Planet carrier housing 64 has a plurality of integral inwardly directed boss portions 82, with each boss portion 64 having a central threaded bore portion 84 concentric with and merging into a larger diameter bore portion 86 whose outer end merges into an annular end suface 88 that serves as a locating surface for inner surface 90 of planet carrier plate 68.

Planet carrier plate 68 is provided with a plurality of bore portions 92 concentric with and only slightly larger in diameter than adjacent boss bore portions 86. Planet carrier plate 68 is also provided with a plurality of larger bore portions 94 that are concentric with bore portions 92, with bore portions 92 and 94 merging into an annular connecting surface 96.

Planet carrier plate 68 is angularly located relative to planet carrier housing 64 via a plurality of preferably equiangularly spaced hollow dowels or apertured dowel pins 98 that are press or interference-fitted into carrier housing bore portions 86 and extend axially outwardly therefrom so that the portion 100 of each hollow dowel 98 that extends outwardly beyond boss annular end surface 88, extends into and is interference-fitted relative to carrier plate bore portion 92, There is less of an interference fit between bore portion 92 and dowel 98 than between the latter and bore portion 86. Carrier plate 68 is physically secured to planet carrier housing 64 via a plurality of cap screws 102 extending freely through dowel central aperture 104 into housing threaded bore portion 84. The force of each cap screw 102 acts on each carrier plate bore connecting surface 96 via a washer 106 freely located in each carrier plate bore portion 94 thereby clamping boss annular end surfaces 88 against corresponding portions of adjacent carrier plate surface 90.

Drive axles with planetary outer or wheel end assembles of the type previously described are utilized in heavy duty applications such as construction machinery and mining equipment. In applications of this type, very high torque loads are transferred through wheel end assemblies 12, and heavy loads must be carried by the planetary assembly and caged roller bearings 56 and 58. The transfer of this torque tends to introduce a circumferential bending moment against dowel pins 98 via the attempted rotation of planet carrier plate 68 relative to planet carrier housing 64. Even a very small smount of circumferential movement or twist between carrier housing 64 and carrier plate 68 will tend to twist or to distort the small clearances between bearings 56, 58 and stub axles 52, 54, respectively, of planet pinions 50 thereby drastically shortening their useful service life. Therefore, unless there is secure fastening of carrier plate 68 relative to carrier housing 64, the carrier plate introduces a bending moment to the dowels via the attempted rotation of the carrier plate. However, the use of cap screws 102 introduces a clamping force between carrier plate 68 and carrier housing 64 to thereby eliminate this bending moment and insuring that hollow dowels 98 are only subjected to a torsional shear load. At the same time, sice only the dowels are subjected to these shear loads, there are no shear loads on the cap screws which then are subject only to tensile clamping loads.

The present structure permits the use of cast ductile iron, having a yield strength of about 55,000 psi, for carrier housing 64 and carrier plate 68, while hollow dowels 98 are constructed of high strength steel, having an about 120,000 psi tensile strength and the hardness of about 51 Rockwell C. Since cap screws 102 are only subjected to tensile loading, their hardness can be in the range of 28–32 Rockwell C. Therefore, the benefits of the present construction are: First, hollow dowels 98 are subjected only to torsional shear loads, with no bending. Secondly, cap screws 102, extending freely axially through dowel control aperture 104, are subjected only to tensile forces and no shear. The use of the high strength hollow dowels together with the press or interference fitting of the dowels relative to both the carrier housing and, to a lesser extent, to the carrier plate (in conjunction with the use of cap screws that are only subject to tension), produces an assembly that approximates the strength of a unitary planet carrier. It should, of course, be understood that a unitary carrier, i.e., where the planet carrier housing includes an integral carrier plate, cannot be used with the present design, wherein the planet gears are provided with stub axles in the manner shown and described herein. Furthermore, even if the planet gears were mounted on a separate planet pin, so as to permit the use of a unitary carrier, such a unitary carrier would be extremely expensive to cast and very difficult to machine.

From the foregoing, it is believed that those familiar with the art will readily recognize and appreciate the novel concepts and features of the present invention. Obviously, while the invention has been described in relation to only a single preferred embodiment, numerous variations, changes and substitutions of equivalents will present themselves to persons skilled in the art and may be made without necessarily departing from the scope and principles of this invention. As the result, the embodiment described herein is subject to various modifications, changes and the like, with the scope of this invention being determined solely by reference to the claims appended hereto.

What is claimed is:

1. In a drive axle of the type having an elongate axle housing, an axle drive shaft, a wheel structure rotatably mounted on said housing by bearing means, and a planetary outer end drivably connected with said axle drive shaft at one end of said housing for imparting rotation to said wheel structure, said planetary outer end having a plurality of members including a planet carrier assembly having a carrier housing and a carrier plate, wherein the improvement comprises in combination:
   a. first means for locating and securing said carrier housing and carrier plate against angular movement relative to one another; and
   b. second means, concentric with said first means, for axially fastening and abuttingly securing said carrier housing and carrier plate against axial movement relative to one another whereby said first means is subject only to torsional shear loading and said second means is subjected only to axial tensile loading.

2. The improved planet carrier assembly of claim 1 wherein said carrier housing includes a plurality of inwardly-directed boss portions, each of which is provided with a first bore portion, with said carrier plate including a plurality of first bore portions concentric with and adjacent to said boss first bore portions, and wherein said first means comprises a plurality of centrally apertured dowel pins fitted into the first bore portions of both said boss portions and said carrier plate.

3. The improved carrier assembly of claim 2 wherein said carrier housing and carrier end plate are constructed of cast ductile iron and said apertured dowel pins are constructed of high strength steel.

4. The improved planet carrier assembly of claim 3 wherein said apertured dowel pins are interference-fitted relative to both of said pluralities of first bore portions.

5. The improved planet carrier assembly of claim 4 wherein there is less of an interference-fit between said carrier plate first bore portions and said dowel pins than between the latter and said boss first bore portions.

6. The improved planet carrier assembly of claim 2 wherein each of said carrier housing boss portions is provided with a second bore portion concentric with said boss first bore portions, with said carrier plate including a plurality of second bore portions concentric with said carrier plate first bore portions, and wherein said second means includes a plurality of cap screws extending from said carrier plate second bore portions as well as extending freely and concentrically through said apertured dowel pins into a retaining fit with said boss second bore portions.

7. The improved planet carrier assembly of claim 6 wherein said carrier plate second bore portions are larger in diameter than said carrier plate first bore portions and said carrier plate first and second bore portions merge into annular connecting surfaces.

8. The improved planet carrier assembly of claim 7 wherein said second means further includes a plurality of annular washers, at least one of which is freely located within each carrier plate second bore portion on each of said cap screws between each cap screw head and each of said annular connecting surfaces.

9. The improved planet carrier assembly of claim 8 wherein the outer end of each of said boss first bore portions merges into a boss annular end surface, wherein the force of each of said cap screws acts, via said washers, against said carrier plate annular connecting surfaces thereby clamping said boss annular end surfaces against corresponding portions of the adjacent surface of said carrier plate.

10. The improved planet carrier assembly of clam 9 wherein said cap screws have a hardness in the range of 28–32 Rockwell C.

11. In a planetary outer end of the type having a plurality of members including a planet carrier assembly having a planet carrier housing and an abutting carrier plate rigidly attached thereto, wherein the improvement comprises in combination:
   a. first means press-fitted relative to both said carrier housing and said carrier plate for locating and securing said carrier housing and carrier plate against angular movement relative to one another, said first means being subject only to torsional shear loading; and
   b. second means concentric with and extending axially freely through said first means, for axially fastening together said carrier housing and carrier plate, said second means being subject only to axial tensile loading.

12. The improved planetary outer end of claim 11 wherein said carrier housing includes a plurality of inwardly-directed boss portions, each of which is provided with a first bore portion, with said carrier plate including a plurality of first bore portions concentric with and adjacent to said boss first bore portions, and wherein said first means comprises a plurality of hollow dowel pins that extend into the first bore portions of both said boss portions and said carrier plate.

13. The improved planetary outer end of claim 12 wherein there is less of a press-fit between said carrier plate first bore portions and said hollow dowel pins than between the latter and said boss first bore portions.

14. The improved planetary outer end of claim 13 wherein said carrier housing and carrier end plate are constructed of cast ductile iron and said hollow dowel pins are constructed of high strength hardened steel.

15. The improved planetary outer end of claim 11 wherein each of said carrier housing boss portions is provided with a second bore portion concentric with said boss first bore portions, with said carrier plate including a plurality of second bore portions concentric with but larger in diameter than said carrier plate first bore portions, said carrier plate first and second portions merging into annular connecting surfaces, and wherein said second means includes a plurality of cap screws extending from said carrier plate second bore portions freely and concentrically through said hollow dowl pins into a screw fit with said boss second bore portions.

16. The improved planetary outer end of claim 15 wherein said second means further includes a plurality of annular washers, at least one of which is freely located within each carrier plate second bore portion on each of said cap screws between each cap screw head and each of said annular connecting surfaces.

17. The improved planetary outer end of claim 16 wherein the outer end of each of said boss first bore portions merges into a boss annular end surface, wherein the force of each of said cap screws acts, via said washers, against its associated carrier plate annular connecting surface, thereby clamping said boss annular end surfaces against corresponding portions of the adjacent surface of said carrier plate.

* * * * *